United States Patent [19]

Miller

[11] Patent Number: 5,161,487

[45] Date of Patent: Nov. 10, 1992

[54] PORTABLE ANIMAL TETHER DEVICE

[75] Inventor: Michael H. Miller, 1529 Golden Rose, Hacienda Heights, Calif. 91715

[73] Assignee: Michael H. Miller, Hacienda Heights, Calif.

[21] Appl. No.: 756,895

[22] Filed: Sep. 9, 1991

[51] Int. Cl.⁵ ............................................. A01K 3/00
[52] U.S. Cl. .................................................... 119/121
[58] Field of Search ............... 119/121, 122, 123, 117, 119/118, 119

[56] References Cited

U.S. PATENT DOCUMENTS

| | | | |
|---|---|---|---|
| 113,318 | 4/1871 | Lyon | 119/117 |
| 535,319 | 3/1895 | Cole | 119/123 |
| 1,092,036 | 3/1914 | Fry | 119/117 |
| 1,465,806 | 8/1923 | Chester | 119/121 |
| 2,790,419 | 4/1957 | Sullivan | 119/122 |
| 3,921,589 | 11/1975 | McGahee | 119/121 |
| 4,831,798 | 5/1989 | Otteson | 119/121 |
| 4,982,701 | 1/1991 | Papak | 119/121 |

FOREIGN PATENT DOCUMENTS

| | | | |
|---|---|---|---|
| 217911 | 1/1909 | Fed. Rep. of Germany | 119/117 |
| 33069 | 6/1912 | Sweden | 119/117 |

Primary Examiner—John J. Wilson
Assistant Examiner—Todd E. Manahan

[57] ABSTRACT

An animal restraint and/or tethering device is composed of a metal rod with one end being pointed to allow easy insertion into the ground, and the other end having a flat metal disk affixed transversely to it. The rod also has one conventional nut affixed around the rod slightly below the disk. Both the disk and the nut are welded in place. The device has two metal chain-like links, one encircling the metal rod below the disk and above the nut, and the other interlinked to the first link but not encircling the rod. Both links are loose so as to rotate freely around the rod. This allows any standard lead or leash loop handle to be received through the loose link and looped over the disk and around the rod and be held in place by the disk and link members.

7 Claims, 1 Drawing Sheet

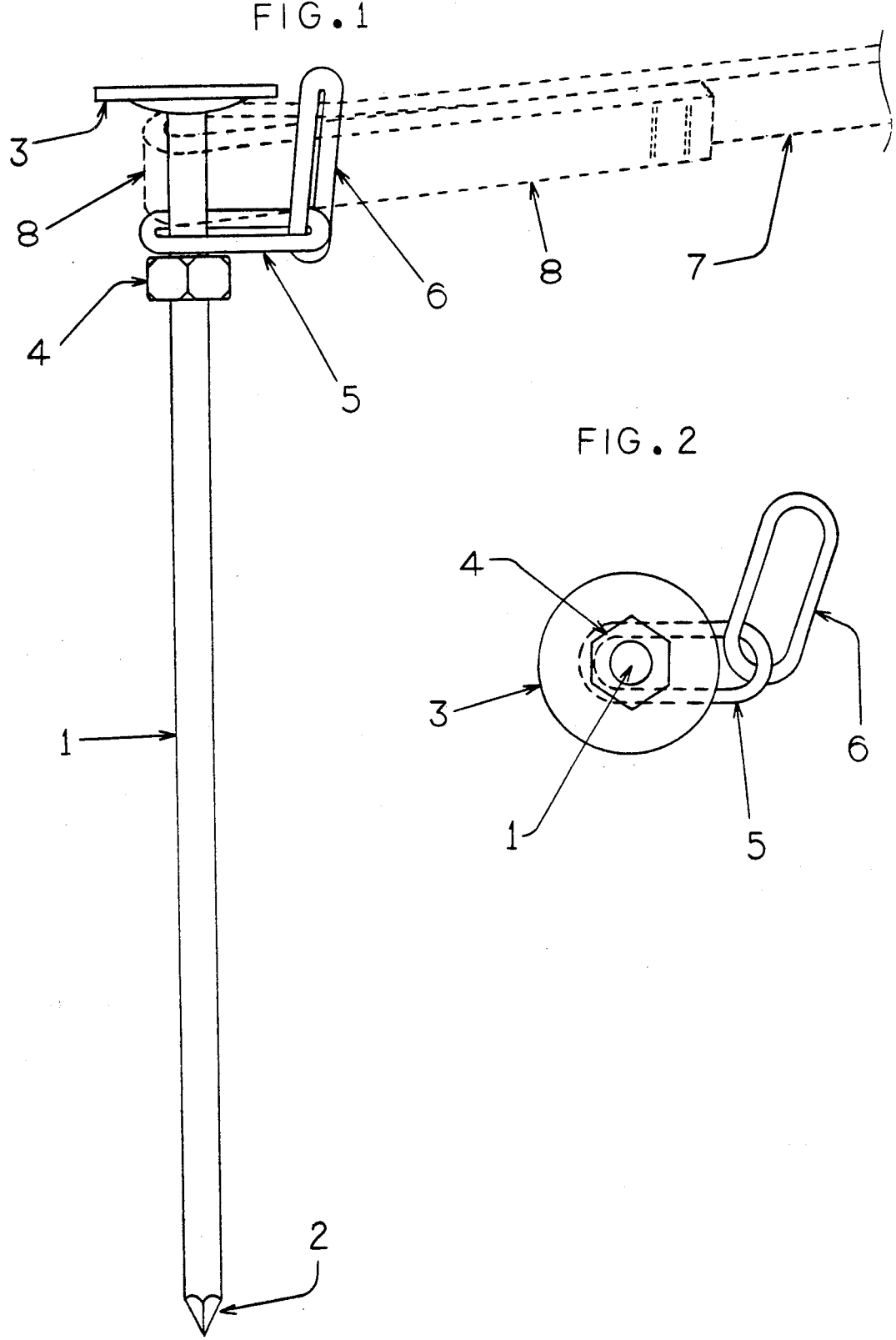

PORTABLE ANIMAL TETHER DEVICE

BACKGROUND OF THE INVENTION

This invention relates to a device for the temporary tethering and/or restraint of dogs or other such animals.

The prior art is predominantly composed of stakes which require a tool such as a hammer for striking the device or a wrench for turning the device to complete installation for use. Furthermore, removal may also require a wrench or digging tool to achieve separation of the device from its emplacement. The necessity of such tools reduce the ease of transfer and portability of those devices. The prior art also requires that some assimilate of clasp, clip or hook be used once the device has been implanted to attain the connection of the tether line. Otherwise, some means of knot must be tied to complete the tethering. Also, many of the prior art stakes have exposed members which may, by design, expose man and beast to potential harm by puncture from, or tripping over, the device.

BRIEF SUMMARY OF THE INVENTION

The instant invention is comprised of a metal shaft with a flat metal disk at the upper end of the shaft, a standard nut around the shaft slightly below the disk, and a point at the lower end. One elongated metal link encircles the shaft below the flat disk, and above the nut. A second similar link is interlinked into and around the first link, but not the shaft.

One principal object of my design is to allow quick insertion and removal for temporary use in any grass, dirt or hard packed sand area, without the need of tools for driving or turning the device. However, in extremely hard areas, a mallet or hammer may be used to drive the shaft into the ground without fear of damage to the device. The device is also designed to be easily removed from the ground and repositioned for use from place to place and thus is readily movable or portable.

Another principal object of my design is for the device to receive the loop handle of any standard lead or leash through the second link member and then be looped over the disk and around the shaft, such that the loop is held in place by the disk and link members, therefore eliminating the need of any extra clasps, clips, hooks or knots.

Furthermore, the device is durable in that it has no internal elements or bearing parts to break or malfunction under pressure of normal insertion, removal or use, and it has a minimal lifetime wear.

BRIEF DESCRIPTION OF THE DRAWINGS

FIG. 1 shows a front, side or cross view of the invention.

FIG. 2 shows a top view of the invention.

DETAILED DESCRIPTION

Referring to the drawings, the numeral 1 indicates a cylindrical metal shaft, rod or stake which is the main body of the device, and is used to penetrate the ground in which the device is used. In FIG. 1, the bottom end 2 is pointed similar to the tip of a nail so as to facilitate penetration of the ground. The top end of the shaft 1 has a flat metal disk 3, larger in diameter than the shaft 1, affixed transversely thereto by means of welding. Below the disk 3, slightly down the shaft 1 and encircling the shaft 1, is a standard nut 4 also affixed to the shaft 1 by means of welding. Encircling the shaft 1 below the flat disk 3 and above the standard nut 4 is one elongated link 5 with a second similar elongated link 6 interlinked through the first link 5, but not around the shaft 1. This then allows both links 5-6 to rotate freely around the shaft 1.

Insertion of the shaft 1 into the ground is achieved by placing the heel of one's hand on the top of the disk 3 and applying pressure downward while at the same time applying a twisting motion clockwise and counterclockwise until the shaft 1 is sunken into the ground up to the underside of the nut or stop element 4.

Removal of the device is obtained by grasping the top disk 3 and pulling upward while twisting the device in a manner similar to that used for inserting the shaft. If the device cannot be twisted by hand, one should place a correctly sized wrench on the nut 4 affixed to the shaft 1 and rotate the shaft 1 to break the bond with the ground. Then the top disk 3 is grasped and pulled upward out of the ground.

The device is designed to allow the use of any standard leash 7 by inserting the hand loop 8 of the leash 7 through the loose elongated link 6 while holding this link 6 in an upright position above the link 5 which encircles the shaft, and then looping the hand loop 8 around the shaft 1 below the disk 3 and drawing the leash 7 back to bring the hand loop 8 tight against the shaft 1. This then eliminates the need of any extra clasps, clips, hooks or knots. If the device has been inserted into the ground up to a depth where the nut 4 is in contact with the ground, this will then allow any lateral pressure exerted by the leash 7 to be transferred to the shaft 1 and allow free rotation of the leash 7 around the shaft 1 without potential entanglement with the device.

I claim:

1. An animal tethering stake comprising:
   an elongated shaft adapted for insertion into the ground;
   a retention member secured to and extending radially outwardly about an upper end of the shaft;
   a stop element secured to the shaft below the retention member and spaced therefrom, the stop element serving to limit penetration of the shaft into the ground;
   a first elongated link rotatably disposed about the shaft between the retention member and the stop element; and
   a second elongated link interlinked through the first link and receiving a hand loop of a leash therethrough;
   whereby, the hand loop extends through the second link, holding the second link in an upright position above the first link, and is looped over and around the shaft and retained thereon by the retention member, thus drawing the hand loop tight against the shaft, the hand loop being free to rotate about the shaft in conjunction with the first and second links.

2. An animal tethering stake according to claim 1, wherein: the retention member and the stop element are secured to the shaft as by welding.

3. A tethering stake according to claim 1, wherein the shaft has a pointed lower end portion for insertion into the ground.

4. An animal tethering stake according to claim 3, wherein: the retention member and the stop element are secured to the shaft as by welding.

5. A tethering stake according to claim 3, wherein said retention member comprises a disk.

6. A tethering stake according to claim 1, wherein said retention member comprises a disk.

7. A tethering stake according to claim 1, wherein said stop element comprises a nut secured about the shaft.

* * * * *